United States Patent
Hu et al.

(10) Patent No.: US 8,840,294 B2
(45) Date of Patent: Sep. 23, 2014

(54) SIDELIGHT BACKLIGHT MODULE WITH ASSISTING SOLAR LIGHT SOURCE AND LIQUID CRYSTAL DISPLAY DEVICE

(71) Applicant: Shenzhen China Star Optoelectronics Technology Co., Ltd., Guangdong (CN)

(72) Inventors: Che-Chang Hu, Shenzhen (CN); Hu He, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 170 days.

(21) Appl. No.: 13/806,987

(22) PCT Filed: Nov. 15, 2012

(86) PCT No.: PCT/CN2012/084704
§ 371 (c)(1),
(2), (4) Date: Dec. 26, 2012

(87) PCT Pub. No.: WO2014/071645
PCT Pub. Date: May 15, 2014

(65) Prior Publication Data
US 2014/0133176 A1 May 15, 2014

(30) Foreign Application Priority Data
Nov. 12, 2012 (CN) .......................... 2012 1 0448285

(51) Int. Cl.
*F21V 7/04* (2006.01)
*F21V 8/00* (2006.01)

(52) U.S. Cl.
CPC .............. *G02B 6/0068* (2013.01); *Y10S 385/90* (2013.01); *Y10S 385/901* (2013.01)
USPC ........... 362/607; 362/561; 362/608; 385/900; 385/901

(58) Field of Classification Search
CPC .............. F21S 48/2243; F21S 48/2268; F21S 48/2281; F21S 48/2293; G02B 6/0006; G02B 6/0008; G02B 6/0018; G02B 6/0023; G02B 6/0028; G02B 6/0055; G02B 6/0066; G02B 6/04
USPC ................. 362/11, 23.09, 23.1, 23.13, 23.16, 362/23.17, 23.2, 326, 327, 328, 330, 362/554–556, 558, 559, 561, 600, 602, 362/606–621; 349/56–58, 61, 62, 64, 65, 349/68; 385/900, 901
See application file for complete search history.

(56) References Cited

U.S. PATENT DOCUMENTS

| | | | | |
|---|---|---|---|---|
| 5,101,325 | A | * 3/1992 | Davenport et al. | 362/628 |
| 6,801,270 | B2 | * 10/2004 | Faris et al. | 349/61 |
| 7,643,105 | B2 | * 1/2010 | Yang | 349/62 |
| 2010/0073600 | A1 | * 3/2010 | Itoh et al. | 349/65 |

FOREIGN PATENT DOCUMENTS

JP 2005091494 A * 4/2005

* cited by examiner

*Primary Examiner* — Hargobind S Sawhney
(74) *Attorney, Agent, or Firm* — Andrew C. Cheng

(57) ABSTRACT

The present invention provides a side-light backlight module with assisting solar light source and which comprises a side-light source; a waveguide having an incident surface facing the side-light source and an emitting surface; an optical film set arranged on top of the waveguide and facing the emitting surface; and an assisting light source directing collected solar light into the incident surface of the waveguide. With the provision of the assisting light source, the solar light can be used as an assisting light source making the backlight module and the liquid crystal display device made therefrom become more environmental friendly.

15 Claims, 2 Drawing Sheets

SIDELIGHT BACKLIGHT MODULE WITH ASSISTING SOLAR LIGHT SOURCE AND LIQUID CRYSTAL DISPLAY DEVICE

CROSS REFERENCE

This application is claiming a priority arisen from a patent application, entitled with "Side-Light Backlight Module with Assisting Solar Light and Liquid Crystal Display Device", submitted to China Patent Office on Nov. 12, 2012, designated with an Application Number 201210448285.6. The whole and complete disclosure of such patent application is hereby incorporated by reference.

FIELD OF THE INVENTION

The present invention relates to a thin film transistor liquid crystal display, also known as TFT-LCD, and more particular to a side-light backlight module with assisting solar light source and also a liquid crystal display made with such a backlight module.

BACKGROUND OF THE INVENTION

Currently, the light source used in a backlight module of a TFT-LCD is typically an LED (light emitting diode) for which is featured with energy saving and comparably high performance.

Nevertheless, energy saving is an everlasting drive to the development of the TCT-LCD as the manufacturer is questing a LCD with more energy saving. The LCD with LED has evolved from four LED light sources arranged on four sides of a waveguide, then to two LED light sources arranged on two longitudinal sides of the waveguide. Then the LED light sources are arranged to the two transversal sides of the waveguide. While the manufacturer pushes to a limit, i.e. only one LED light source is arranged on a single transversal side, and which has become a threshold for breaking through.

SUMMARY OF THE INVENTION

It is the objective of the present invention to provide a side-light backlight module with assisting solar light source and a liquid crystal display device incorporated with such as backlight module, and in which solar light can be used as an assistant light source such that the LCD made therefrom can save more energy and environmental friendly.

In order to resolve the above described prior art issue, the present invention provides a sidelight backlight module with solar light assistance, which comprises a sidelight source;

a waveguide having an incident surface facing the sidelight source and an emitting surface;

an optical film set arranged on top of the waveguide and facing the emitting surface; and an assisting light source directing collected solar light into the incident surface of the waveguide.

Wherein the assisting solar light source further comprises:

an optical connector disposed onto the backlight module for coupling an external solar light-collecting device;

a plurality of fiber optics coupled to the optical connector for transmitting solar light from the collecting device;

Wherein each of the fiber optics has a light-emitting end facing toward the incident surface of the waveguide, Wherein each of the light emitting ends is securely attached to a bracket.

Wherein the side light source and the assisting light source are arranged on the sides of the waveguide and each faces toward the incident surface.

Wherein the bracket is an aluminum extrusion mounted onto the other side of the side light source.

Wherein the side light source and the assisting light source are arranged on the same side of the waveguide and each faces toward the incident surface.

Wherein the fiber optic bracket is a PCB mounted on the side light source, and the LED and the light emitting ends are arranged alternatively.

Wherein the optical connector is a coupler mounted onto the backlight module.

Wherein the backlight module further comprises a switching device selecting one of the side light source or the assisting solar light source as working light source, or both as the working light sources.

Correspondingly, the present invention further includes a liquid crystal display device incorporated with such a backlight module with the assisting solar light source.

The present invention can be concluded with the following advantages.

With the implementation of an assisting solar light source into the present invention, the solar light can be served as an assisting light source benefiting the brightness of the backlight module such that during the daytime, the solar light can be used as a light source; while in the cloudy and nighttime, the LED light source can be used as the main light source. Accordingly, the overall power of the LED can be reduced so as to meet the standard of the environmental friendly.

By providing an optical connector on the backlight module, it is readily convenient for the backlight module to collect the solar light source during the daytime. The collected solar light can be readily served as the assisting light source.

BRIEF DESCRIPTION OF DRAWINGS

In order to give a better and thorough understanding to the whole and other intended purposes, features and advantages of the technical solution of the present invention, detailed description will be given with respect to preferred embodiments provided and illustrated herebelow in accompanied drawings. Apparently, with the spirit of the embodiments disclosed, person in the skilled in the art can readily come out with other modifications as well as improvements without undue experiment. In addition, other drawings can be readily achieved based on the disclosed drawings.

DETAILED DESCRIPTION OF PREFERRED EMBODIMENT

Detailed description will be given in view of preferred embodiments made in accordance with the present invention.

Figure 1:
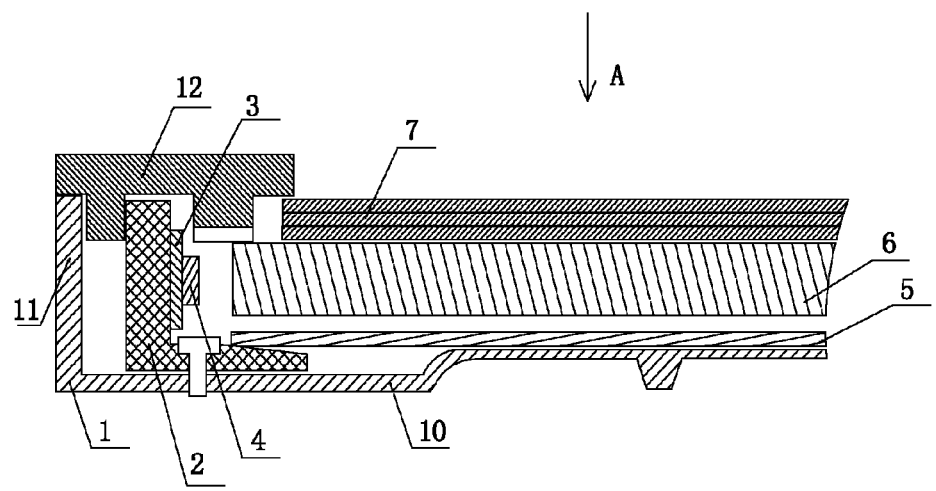
FIG. 1 is an illustrational and structural view of a backlight module made in accordance with a preferred embodiment of the present invention.
Figure 2:
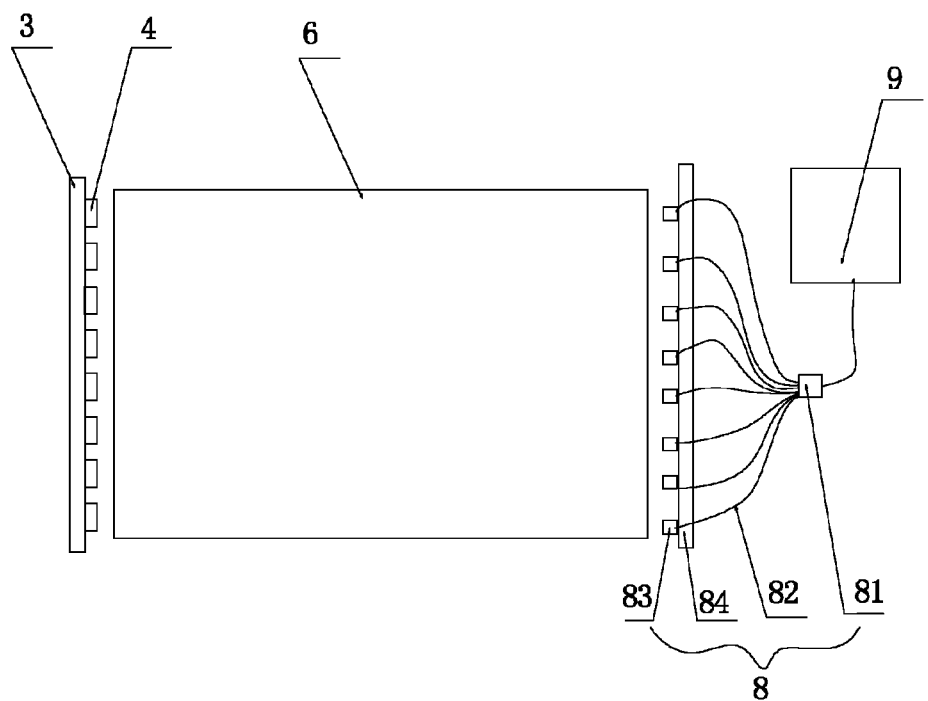
FIG. 2 is a plan view of a first embodiment viewed along a direction A of FIG. 1.

Referring to FIGS. 1 and 2, illustrational and structural views of a backlight module made in accordance with a preferred embodiment of the present invention are disclosed. The backlight module with an assisting solar light source at least includes the following parts or components.

A backboard 1 is configured with a baseboard 10, and a vertical tab 11 perpendicular to the backboard 10.

An aluminum extrusion 2 is disposed on the baseboard 10 and arranged in parallel to the vertical tab 11.

A printed circuit board 3 is arranged on an inner wall of the extrusion 2.

The printed circuit board 3 is arranged with a light source 4, which is a LED light source arranged on a side of a waveguide. The light source 4 includes a plurality of light emitting diodes.

On the baseboard 10, a reflective film 5, the waveguide 6, and an optical film module 7 are arranged sequentially. The waveguide 6 includes an incident surface and an emitting surface and the incident surface faces the light source 4.

The optical film 7 is disposed on top of the waveguide 6 and faces the exiting surface. The optical film module 7 is typically configured with a plurality of optical films with different purposes and functions, such as a diffuser, a prism and etc. By this arrangement, the brightness of the light beam emitted from the emitting surface of the waveguide is bright and homogeneous which can readily illuminate a liquid crystal display panel.

A plastic frame 12 surrounds the peripheral of the optical film module 7 so as to securely position the vertical tab 11 and the extrusion 2.

The backlight module further includes.

An assisting light source 8 is used to collect solar light and then direct the solar light to the incident surface of the waveguide.

The assisting light source 8 further includes the following parts.

An optical connector 81 is arranged onto the backlight module, and which is used to couple with a collector 9. Substantially, the optical connector 81 is a fiber optic coupler mounted onto the backboard 1 of the backlight module. The collector 9 can be coupled to the optical connector 81 by means of fiber optics. Accordingly, the collected light can be readily and effectively transmitted to the waveguide 6. With the fiber optics, the collector 9 and the backlight module can be kept with a proper distance so as to collect solar light.

A plurality of fiber optics 82 which are used to transmit collected solar light by the collector 9.

An output 83 of each of the fiber optics 82 is directed to the incident surface of the waveguide 6.

Each of the output 83 of the fiber optic is securely attached to the bracket 84.

The light source 4 and the assisting light source 8 are arranged on opposite sides of the waveguide 6 and project light beam into the waveguide 6 through the incident surfaces.

The bracket 84 can be embodied as an aluminum extrusion disposed on the other side of the light source. (Not shown in FIG. 1)

The backlight module further includes a switching device (not shown in Figure). The switching device can be used to switch the working light source to one of the side light source or the assisting light source or selecting both of them as the working light sources. For example, during the daytime, the assisting light source 8 can be selected, while in the cloudy day or the nighttime, both the light sources are selected.

Figure 3:
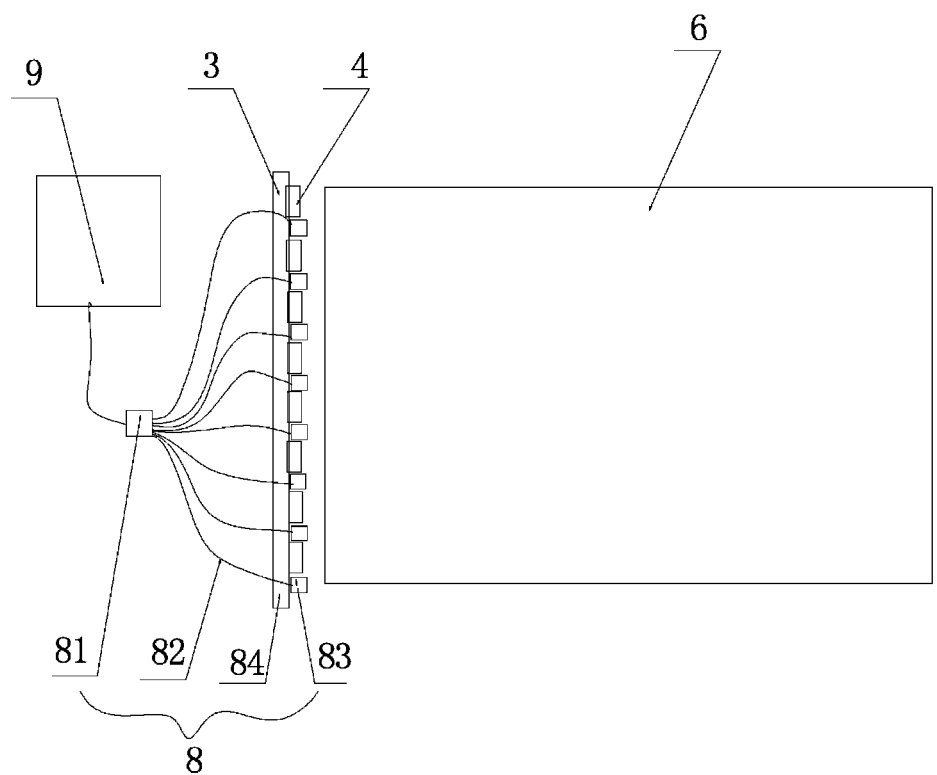
FIG. 3 is a plan view of a second embodiment viewed along a direction A of FIG. 1.

As shown in FIG. 3 which is a plan view of a second embodiment viewed along a direction A of FIG. 1. In this preferred embodiment, the light source 4 and the assisting light source 8 are both arranged on the same side of the waveguide 6 and project the light beam into the waveguide through the incident surface.

In the embodiment, the bracket disclosed in the prior embodiment is replaced by the PCB of the light source 4. The output 83 of the assisting light source 8 are alternatively arranged with the LED of the light source 4.

Since details and working principle are similar to the embodiment shown in FIG. 2, and no detailed description is given.

The present invention further includes a liquid crystal display device incorporated with the backlight module shown in FIGS. 1 to 3.

The present invention can be concluded with the following advantages.

With the implementation of an assisting solar light source into the present invention, the solar light can be served as an assisting light source benefiting the brightness of the backlight module such that during the daytime, the solar light can be used as a light source; while in the cloudy and nighttime, the LED light source can be used as the main light source. Accordingly, the overall power of the LED can be reduced so as to meet the standard of the environmental friendly.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the clams of the present invention.

The invention claimed is:

1. A side-light backlight module with assisting solar light source, comprising:
   a sidelight source;
   a waveguide having an incident surface facing the sidelight source and an emitting surface;
   an optical film set arranged on top of the waveguide and facing the emitting surface; and
   an assisting light source directing collected solar light into the incident surface of the waveguide.

2. The side-light backlight module with assisting solar light source as recited in claim 1, wherein the assisting solar light source further comprises an optical connector disposed onto the backlight module for coupling an external solar light collecting device; a plurality of fiber optics coupled to the optical connector for transmitting solar light from the collecting device; wherein each of the fiber optics has an light emitting end facing toward the incident surface of the waveguide, wherein each of the light emitting ends is securely attached to a bracket.

3. The side-light backlight module with assisting solar light source as recited in claim 2, wherein the side light source and the assisting light source are arranged on the sides of the waveguide and each faces toward the incident surface.

4. The side-light backlight module with assisting solar light source as recited in claim 3, wherein the backlight module includes a fiber optic bracket which is an aluminum extrusion mounted onto the other side of the side light source.

5. The side-light backlight module with assisting solar light source as recited in claim 2, wherein the side light source and the assisting light source are arranged on the same side of the waveguide and each faces toward the incident surface.

6. The side-light backlight module with assisting solar light source as recited in claim 2, wherein the fiber optic bracket is a PCB mounted on the side light source, and the LED and the light emitting ends are arranged alternatively.

7. The sidelight backlight module with assisting solar light source as recited in claim 6, wherein the optical connector is a coupler mounted onto the backlight module.

8. The side-light backlight module with assisting solar light source as recited in claim 7, further comprising a switching device selecting one of the side light source or the assisting solar light source as working light source, or both as the working light sources.

9. The side-light backlight module with assisting solar light source as recited in claim 7, further comprising a switching device selecting one of the side light source or the assisting solar light source as working light source, or both as the working light sources.

10. A side-light backlight module with assisting solar light source, comprising:
    a sidelight source;
    a waveguide having an incident surface facing the sidelight source and an emitting surface;
    an optical film set arranged on top of the waveguide and facing the emitting surface; and
    an assisting light source directing collected solar light into the incident surface of the waveguide, wherein the assisting solar light source further comprises an optical connector disposed onto the backlight module for coupling an external solar light collecting device; a plurality of fiber optics coupled to the optical connector for transmitting solar light from the collecting device; wherein each of the fiber optics has an light emitting end facing toward the incident surface of the waveguide, wherein each of the light emitting ends is securely attached to a bracket.

11. The side-light backlight module with assisting solar light source as recited in claim 10, wherein the side light source and the assisting light source are arranged on the sides of the waveguide and each faces toward the incident surface.

12. The side-light backlight module with assisting solar light source as recited in claim 11, wherein the bracket is an aluminum extrusion mounted onto the other side of the side light source.

13. The side-light backlight module with assisting solar light source as recited in claim 11, wherein the side light source and the assisting light source are arranged on the same side of the waveguide and each faces toward the incident surface.

14. The side-light backlight module with assisting solar light source as recited in claim 13, wherein the fiber optic bracket is a PCB mounted on the side light source, and the LED and the light emitting ends are arranged alternatively.

15. The sidelight backlight module with assisting solar light source as recited in claim 14, wherein the optical connector is a coupler mounted onto the backlight module.

* * * * *